(12) United States Patent
Park et al.

(10) Patent No.: US 9,411,403 B2
(45) Date of Patent: Aug. 9, 2016

(54) SYSTEM AND METHOD FOR DYNAMIC DCVS ADJUSTMENT AND WORKLOAD SCHEDULING IN A SYSTEM ON A CHIP

(71) Applicant: Qualcomm Incorporated, San Diego, CA (US)

(72) Inventors: Hee-Jun Park, San Diego, CA (US); Sejoong Lee, San Diego, CA (US); Steven Thomson, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 351 days.

(21) Appl. No.: 14/084,610

(22) Filed: Nov. 19, 2013

(65) Prior Publication Data

US 2015/0143142 A1  May 21, 2015

(51) Int. Cl.
*G06F 1/32* (2006.01)
*G06F 9/445* (2006.01)
*G06F 1/20* (2006.01)

(52) U.S. Cl.
CPC .............. *G06F 1/324* (2013.01); *G06F 1/206* (2013.01); *G06F 1/329* (2013.01); *G06F 9/44505* (2013.01); *Y02B 60/1217* (2013.01); *Y02B 60/1275* (2013.01); *Y02B 60/144* (2013.01)

(58) Field of Classification Search
CPC ......... G06F 1/206; G06F 1/324; G06F 1/329; G06F 9/44505; G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22

USPC ......................................................... 713/320
See application file for complete search history.

(56) References Cited

U.S. PATENT DOCUMENTS

| 6,076,171 A * | 6/2000 | Kawata ..................... G06F 1/08 713/322 |
| 7,793,125 B2 | 9/2010 | Berry, Jr. et al. |
| 8,185,758 B2 | 5/2012 | Henroid et al. |
| 2011/0145605 A1 | 6/2011 | Sur et al. |

(Continued)

FOREIGN PATENT DOCUMENTS

EP  2560073 A1  2/2013

OTHER PUBLICATIONS

International Search Report and Written Opinion—PCT/US2014/066353—ISA/EPO—Feb. 18, 2015.

*Primary Examiner* — Zahid Choudhury
(74) *Attorney, Agent, or Firm* — Smith Tempel

(57) ABSTRACT

Various embodiments of methods and systems for dynamically adjusting operating frequency settings of one or more processing components in a portable computing device ("PCD") are disclosed. One such method involves receiving a request to adjust an operating frequency setting of a processing component to a required frequency ("F_req") to process a workload. Factor readings associated with the operating capacity of the processing component may be taken. Based on the readings, performance curves associated with the processing component may be queried. The performance curves are used to determine the optimal operating frequency ("F_opt") for the processing component. The F_opt is compared to the F_req and, if the F_req is less than F_opt, the operating frequency setting of the processing component is set to F_opt. Advantageously, as compared to F_req, at F_opt workload processing may be more efficient and a low power mode may be entered sooner.

20 Claims, 13 Drawing Sheets

(56) References Cited

U.S. PATENT DOCUMENTS

| | | |
|---|---|---|
| 2011/0172984 A1 | 7/2011 | Cher et al. |
| 2011/0173463 A1* | 7/2011 | Gargash ............... G06F 1/3203 713/300 |
| 2012/0066526 A1 | 3/2012 | Salsbery et al. |
| 2013/0060555 A1 | 3/2013 | Thomson et al. |
| 2014/0032010 A1* | 1/2014 | Jung .................... G06F 1/3206 700/299 |

\* cited by examiner

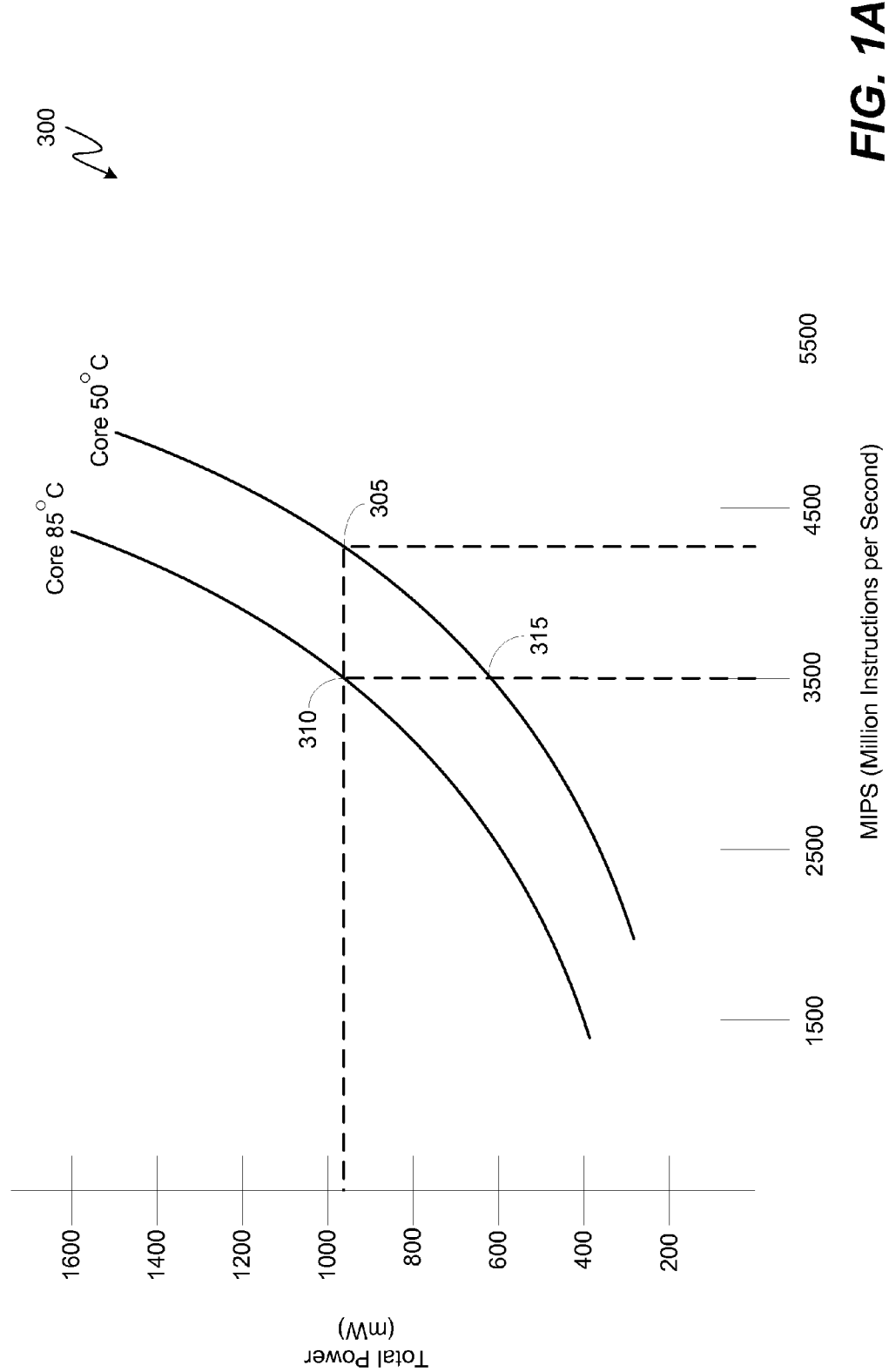

SYSTEM AND METHOD FOR DYNAMIC DCVS ADJUSTMENT AND WORKLOAD SCHEDULING IN A SYSTEM ON A CHIP

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

From the perspective of a user, a compact form factor is a desirable aspect in a PCD. Compact form factors, however, come with inherent design challenges. For instance, in a PCD there typically is not enough space for engineers and designers to combat thermal degradation or failure of processing components through wide spacing arrangements or inclusion of passive cooling components. Consequently, processing components in a PCD often cannot be run at their maximum rated power frequencies without producing detrimental levels of thermal energy. In a PCD, thermal energy generation must be managed through the application of various thermal management techniques that may include wilting or shutting down electronics at the expense of performance.

Users also desire generous power supplies in their PCDs. Due to the limited form factors, however, simply including large power sources is usually not a solution for meeting a user's power supply expectations. As such, in a PCD power consumption must be managed. Power conservation schemes seeking to minimize power consumption (whether in an effort to save power or in an effort to avoid unnecessary thermal energy generation) often dictate that processing speeds be set such that a minimum quality of service ("QoS") level is met.

Thermal management techniques are employed within a PCD in an effort to seek a balance between mitigating thermal energy generation and impacting the QoS provided by the PCD. Similarly, power conservation schemes are employed within a PCD in an effort to seek a balance between power consumption and QoS level. In a PCD that has heterogeneous processing components, the ramifications of balancing those tradeoffs can be difficult to manage because the various processing components within the PCD are not created equal.

For instance, the power frequency supplied to a processing component per a thermal mitigation technique or a power conservation scheme may not represent the most efficient point on the processor's performance curve. As another example, there may be multiple processing components in a PCD capable of processing a given block of code and, depending on the respective static and dynamic operating factors of those components, one will be more efficient at processing that block of code than another.

Accordingly, what is needed in the art is a method and system for setting the power frequency of a processing component in a PCD to the frequency that represents the most efficient workload processing for that processing component without undermining ongoing thermal mitigation or power conservation goals. Further, what is needed in the art is a system and method for scheduling or allocating workload in a PCD across heterogeneous processing components based on real time, or near real time, comparative analysis of the optimum frequencies in processor performance curves without undermining ongoing thermal mitigation or power conservation goals.

SUMMARY OF THE DISCLOSURE

Various embodiments of methods and systems for dynamically adjusting operating frequency settings of one or more processing components in a portable computing device ("PCD") are disclosed. Because individual processing components in a heterogeneous, multi-processor in a PCD may exhibit different processing efficiencies depending on various static and dynamic factors associated with each processing component, dynamic DCVS adjustment and workload scheduling techniques query performance curves in real time, or near real time, to determine optimum operating frequencies for processing components so that power efficiency is optimized when processing workloads.

One such method involves receiving a request to adjust an operating frequency setting of a processing component to a requested frequency ("F_req"). Upon recognizing that the operating frequency for the processing component will be adjusted, readings of one or more static and/or dynamic factors (e.g., current leakage, voltage levels, operating temperature, power supply voltage margin, etc.) associated with the operation of the processing component may be taken. Using the operating readings, performance curves associated with the processing component may be queried. The performance curves comprise a representation of the relationship between power consumption and operating frequency for the processing component when operating at a given operating temperature. The performance curves are used to determine the optimal operating frequency ("F_opt") for the processing component. When the processing component is supplied power at the F_opt frequency, the ratio of power consumed per workload processed is optimized. The F_opt is compared to the F_req and, if F_req is greater than or equal to F_opt, the operating frequency setting of the processing component is set to F_req. If, however, the F_req is less than F_opt, the operating frequency setting of the processing component is set to F_opt. Advantageously, when the operating frequency is set to F_opt in lieu of F_req, the processing time for a workload is shortened and the power consumed to process the workload is minimized per MIPS of workload.

Some embodiments of the systems and methods for dynamic DCVS adjustment envision that the processing component is a multi-core, heterogeneous processor that comprises a plurality of individual processing components. In such scenarios, the readings of one or more static and/or dynamic factors (e.g., current leakage, voltage levels, operating temperature, power supply voltage margin, etc.) for each of the plurality of individual processing components may be taken and the performance curves for each queried. The performance curves may then be averaged to create a single set of performance curves representative of the group of individual processors. The optimum power frequency determined from the average performance curves may then be applied across the plurality of individual processing components.

Further, some embodiments of the systems and methods for dynamic DCVS adjustment envision that the power supplied to the processing component may be at the F_opt frequency and per a pulse width modulation ("PWM") power management scheme. Advantageously, by supplying the power to the processing component at the F_opt frequency and per a PWM power management scheme, certain embodiments may optimize power consumption while the processing component is processing a block of code and optimize power savings after the block of code is processed as a power collapse period is maximized.

Additionally, some embodiments of the systems and methods for dynamic DCVS adjustment that supply power to the processing component at the F_opt frequency and per a pulse width modulation ("PWM") power management scheme envision do so such that the average operating frequency supplied over a duty cycle equals a targeted frequency or F_req.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1A is a graph illustrating a pair of performance curves of an exemplary processing component operating under different thermal conditions;

DETAILED DESCRIPTION

Figure 1B:
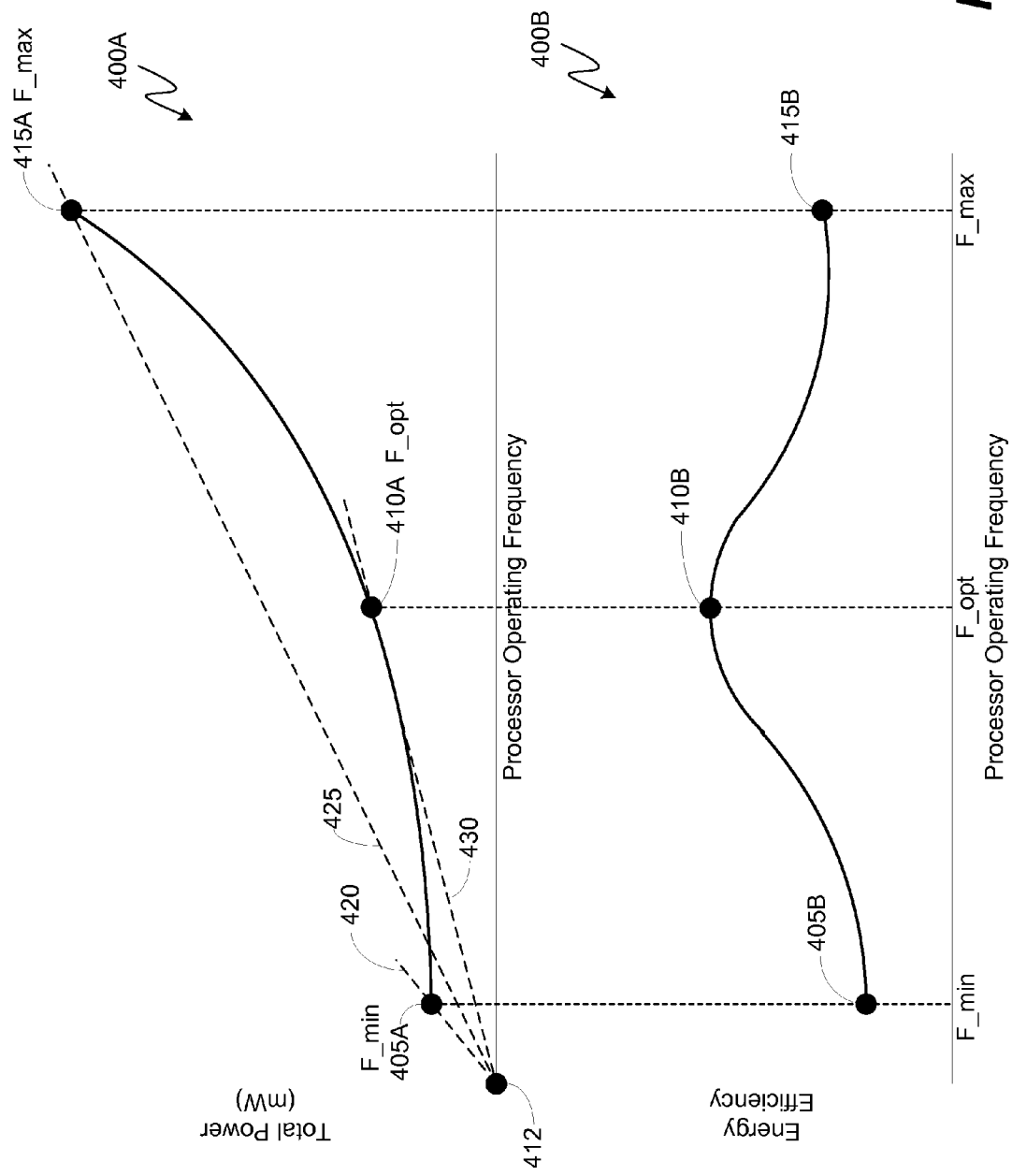
FIG. 1B is a graph illustrating a pair of performance curves of an exemplary processing component operating at a given thermal condition, under a light workload, and with an optimal power frequency.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "processing engine" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "chip," "video codec," "system bus," "image processor," and "media display processor ("MDP")" are non-limiting examples of processing components that are controllable through dynamic clock and voltage scaling ("DCVS") techniques and may reside in a PCD. These terms for processing components are used interchangeably except when otherwise indicated. Moreover, as distinguished in this description, any of the above or their equivalents may be comprised of one or more distinct processing components generally referred to herein as "core(s)" and "sub-core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload" and "block of code" are used interchangeably and generally directed toward the processing burden, or percentage of processing burden, that is associated with, or may be assigned to, a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management" and "thermal mitigation measure(s)" are used interchangeably.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power frequency being supplied to the processor.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing processing performance for QoS optimization in a PCD that has a heterogeneous processing component(s) can be accomplished by leveraging the diverse performance characteristics of the individual processing engines that are available for workload allocation. With regards to the diverse performance characteristics of various processing engines that may be included in a heterogeneous processing component, one of ordinary skill in the art will recognize that performance differences may be attributable to any number of reasons including, but not limited to, differing levels of silicon, design variations, etc. Moreover, one of ordinary skill in the art will recognize that the performance characteristics associated with any given processing component may vary in relation with the operating temperature of that processing component, the power level supplied to that processing component, etc.

For instance, consider an exemplary heterogeneous multi-core processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low performance to medium performance processing core within the heterogeneous processor will exhibit a lower power leakage rate at a given workload capacity, and consequently a lower rate of thermal energy generation, than a processing core having a relatively high performance capacity. The higher capacity core may be capable of processing a given number of MIPS in a shorter amount of time than a lower capacity core. Similarly, a high capacity core with a processing speed that has been wilted may exhibit a lower power leakage rate at a given workload capacity, and consequently a lower rate of thermal energy generation, than when processing at its full, unchecked capacity.

Even so, depending on the thermal conditions under which the cores may be operating, the lower performance core may be more, or less, efficient (in power consumption) at processing the given number of MIPS than a high performance core. As such, by considering the individual performance curves of the diverse cores within the heterogeneous processor, where the performance curves indicate the power consumed by a given core at a given operating temperature in order to process a given number of MIPS, a dynamic DCVS adjustment algorithm can be leveraged to set the power frequency for each core such that a ratio of processed MIPS/power consumption (power efficiency ratio) is optimized. Notably, and as one of ordinary skill in the art would recognize, the power efficiency ratio may be quantified as operating frequency/power consumption. The power efficiency ratios may then be compared so that a scheduling component allocates workload to the processor best positioned to efficiently process the workload.

Additionally, it is envisioned that certain embodiments of a dynamic DCVS adjustment algorithm may implement a pulse width modulation ("PWM") power management scheme to the processor(s) such that the processor(s) modulate between a power collapsed state and a processing state running at the optimal power frequency. Advantageously, in embodiments of a dynamic DCVS system and method that include PWM based on the optimal frequency, power consumption is optimized when the processor is processing and power savings are optimized when the processor is collapsed.

Notably, although exemplary embodiments of the systems and methods are illustrated and described herein in the context of individual processing components, it is envisioned that embodiments of the systems and methods may average the performance curves of multiple processing components (such as cores in a multi-core CPU) to arrive at a single average processing curve. Based on the single, average processing curve of the multiple processing components, an optimum frequency may be determined and applied to each core such that the power density across the entire processing component is optimized even though the processing efficiencies associated with individual cores may not be optimized. Such an embodiment may be applied in connection with a synchronized parallel processing workload on a multi-core processing component, for example.

As a non-limiting example of an application for a dynamic DCVS method, a particular block of code may be processed by either of a central processing unit ("CPU") or a graphical processing unit ("GPU") within an exemplary PCD. Advantageously, instead of predetermining that the particular block of code will be processed by one of the CPU or GPU, an exemplary embodiment may select which of the processing components will be assigned the task of processing the block of code as the need for processing the code ripens. That is, a "snap shot" of the performance curves of the CPU and GPU running at their optimal frequencies may be compared so that the processor best equipped to efficiently process the block of code is assigned the workload. Notably, it will be understood that subsequent processor selections for allocation of subsequent workloads may be made in real time, or near real time, as the blocks of code exit a scheduling queue. In this way, a frequency selection module may leverage operating temperatures associated with individual cores in a heterogeneous processor to optimize QoS by selecting the power frequencies that are most optimal for processing workloads and then selecting processing cores just prior to workload allocation.

FIG. 1A is a graph 300 illustrating a pair of performance curves (Core 85° C., Core 50° C.) of an exemplary processing component operating under different thermal conditions. The processing component may be a core within a heterogeneous multi-core processor and may be a high capacity, medium capacity or low capacity core. More specifically, as one of ordinary skill in the art will acknowledge, the processing component may be any processing engine capable of processing a given block of code including, but not limited to, a CPU, GPU, DSP, programmable array, video encoder/decoder, system bus, camera sub-system (image processor), MDP, etc. Moreover, as described above, the exemplary processing engine may be a core or sub-core within a CPU, GPU, etc.

As can be seen from the FIG. 1A illustration, at a workload of 3500 MIPS the exemplary core operating in a 50° C. environment consumes approximately 620 mW of power (point 315) but, at the same 3500 MIPS workload, the power consumption of the core increases to almost 1000 mW of power (point 310) when the operating environment reaches 85° C. Similarly, for a given operating temperature, the processing efficiency of a core decreases with an increase in workload. Referring to the Core 50° C. curve, for example, when the workload is increased from 3500 MIPS to approximately 4300 MIPS, the power consumption increases to almost 1000 mW (point 305).

It can be seen from the FIG. 1A illustration that, for a given processing component, the efficiency of the processing component in terms of power consumption decreases as the operating temperature rises (i.e., as the operating temperature of a processing component increases, the number of MIPS it is capable of processing at a given operating frequency will decrease). Notably, one of ordinary skill in the art will recognize that a rise in operating temperature of an exemplary processing component may be caused by any number of factors or combination of factors including, but not limited to, increased power leakage within the processing component associated with higher clocking speeds, thermal aggressors adjacent to the processing component, malfunctioning components adjacent to the processing component, change of ambient environment, etc. Moreover, one of ordinary skill in the art will recognize that increased workloads on a processing component may cause the operating temperature associated with the processing component at the time of workload allocation to rise as a result of an increased power leakage rate associated with an increase in power consumption. Regardless of why the operating temperature of a processing component may rise or fall, it is important to note from the FIG. 1A illustration that, in general, the processing efficiency of a given processing component decreases inversely with an increase in operating temperature.

Turning now to FIG. 1B, a graph 400 illustrating a pair of performance curves of an exemplary processing component operating at a given thermal condition, under a light workload, and with an optimal power frequency 410 is shown. One of ordinary skill in the art will recognize that the exemplary processor represented by the performance curve pair in FIG. 1B may be contained in a common heterogeneous multi-processor system on a chip ("SoC"). Alternatively, it is envisioned that the performance curve pair 400 may represent an average curve derived from multiple processing components.

The upper curve 400A plots the performance of the exemplary processor when operating at a given temperature. As can be seen in the FIG. 1B illustration, the y-axis of the performance curve 400A represents total power consumed by the exemplary processing component and the x-axis represents the processor operating frequency, i.e. the power frequency supplied to the processing component. A maximum power frequency, F_max, that may be supplied to the exemplary processing component is represented by point 415A and a minimum power frequency, F_min, is represented by point 405A. As one of ordinary skill in the art would understand, below F_min 405A the exemplary processing component is power collapsed such that no power is being consumed.

As noted above, the processor operating frequency correlates with the MIPS capable of being processed by the given processor. Accordingly, for the exemplary processing component associated with the power curves 400 of the FIG. 1B illustration, the sheer volume of workload it can process is maximized at point 415, i.e. when the maximum rated processing frequency is supplied to it. Notably, however, point 415A does not represent the most power efficient point along curve 400A. With this in mind, slopes 420, 430 and 425 depict the ratio of power consumption/operating frequency associated with each of points 405A, 410A and 415A, respectively. From the slopes, 420, 430 and 425, it can be seen that the exemplary processing component is most efficient along slope 430 which is tangential to performance curve 400A at F_opt 410A. Consequently, a system and method for dynamic DCVS adjustment may dictate that the power frequency provided to the exemplary processing component associated with the FIG. 1B curves be set at F_opt, thereby optimizing the amount of workload processed by the processor per milliwatt ("mW") of power consumed.

The power efficiency represented by the frequency that corresponds to point 410A can be seen in the complimentary performance curve 400B. In the 400B plot, the y-axis represents the energy efficiency of the slopes depicted in plot 400A while the x-axis continues to represent processor operating frequency. As the slopes move up curve 400A to intersect various points, the plot of 400B indicates that, for the given operating temperature, the exemplary processing component is most energy efficient in processing workloads at point 410B, i.e. when the power frequency supplied to it is F_opt. Consequently, embodiments of the systems and methods for dynamic DCVS adjustment may seek to adjust frequency settings on power supplies to match the F_opt contained in a performance curve associated with a given processor's operating temperature.

Figure 1C:
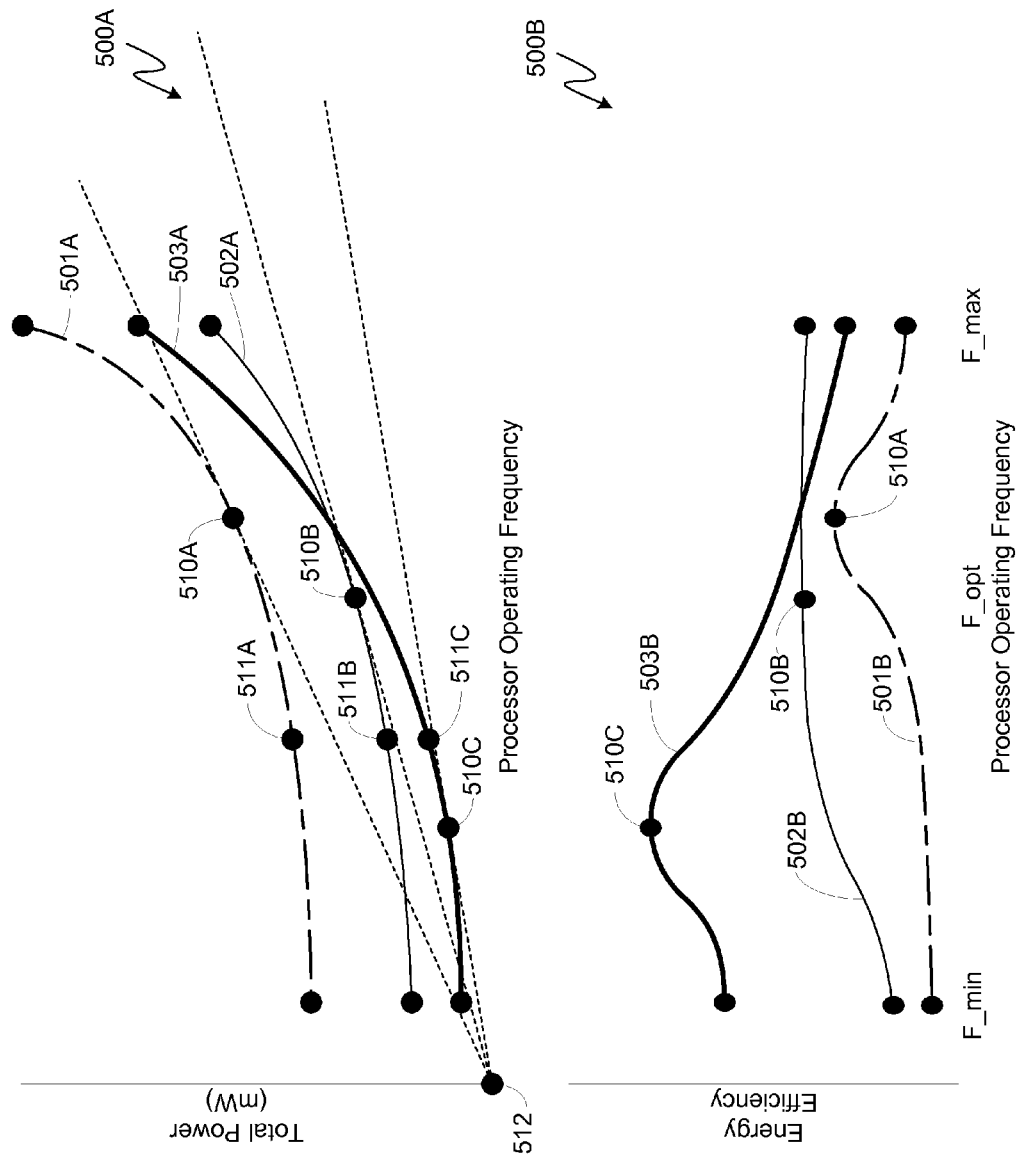
FIG. 1C is a graph illustrating performance curves of exemplary processing components operating under different thermal conditions, a light workload, and with different optimal power frequencies.

Building on the performance curves depicted in the FIG. 1B graph, the graph 500 of FIG. 1C illustrates performance curves of exemplary processing components operating under different thermal conditions, a light workload, and with different optimal power frequencies. In the graph 500A, three exemplary performance curve pairs 501, 502 and 503 are shown plotted together. At point 512, the cores associated with the curve pairs 501, 502 and 503 are power collapsed, i.e. no power is being consumed by the cores. For illustrative purposes, performance curves 501 may be associated with a high capacity core running at an operating temperature of 85° C., performance curves 502 may be associated with another high capacity core with similar characteristics to the core associated with curves 501 except it is running at an operating temperature of 50° C., and performance curves 503 may be associated with a low capacity core running at a relatively cool operating temperature of 90° C.

Considering the performance curve pairs individually, a light workload allocation may normally dictate a power frequency be supplied that is below the F_opt for the given core. For instance, a light workload that does not require particularly fast processing in order to provide a user with a high QoS may be allocated to the core associated with performance curves 501 and, in response to that allocation, a power management module may request that the power frequency supplied to that processor is F_req 511A. In such a scenario, an embodiment of a dynamic DCVS adjustment method may adjust the power frequency up to F_opt so that the workload gets processed more efficiently, albeit processed more quickly than necessary in view of the QoS. Similarly, a power management module seeking to allocate a light workload to the core associated with performance curves 502 may request that the power frequency be set to point 511B. An embodiment of a dynamic DCVS adjustment method may override the request to set the frequency at point 511B in favor of the more efficient setting associated with F_opt 510B. For the core associated with performance curves 503, however, the power management module may request that the operating frequency be set at point 511C in order to process the light workload without overly impacting QoS. In such a scenario, a dynamic DCVS adjustment method may allow the processing frequency to be set at point 511C even though the processor associated with curves 503 is more efficient at the frequency represented by point 510C.

Continuing with the performance curves depicted in the FIG. 1C graph 500, certain embodiments of a dynamic DCVS adjustment method may compare the optimal processing frequencies 510 of each eligible core (e.g., the cores associated with performance curves 501, 502, 503). Based on the comparison from graph 500B, and assuming that each processor may process the workload at its F_opt 510 without detrimentally impacting QoS, a dynamic DCVS adjustment method may determine that the processor associated with performance curves 503 and F_opt 510C is best positioned to efficiently process the block of code. Accordingly, the block of code may be scheduled to the processor associated with curve pair 503 and the processor supplied power at a frequency equal to 510C.

Furthering the example of an embodiment of a dynamic DCVS adjustment method that compares performance curves and F_opt frequencies of multiple eligible processing cores before selecting the core to which a block of code will be allocated, consider a workload that requires a fast processing speed in order to maintain a desirable QoS level (e.g., a gaming application). Further suppose that the required frequency is above F_opt 510C but still below F_opts 510A and 510B. In such a scenario, an embodiment of a dynamic DCVS adjustment method may select the core associated with curves 502 as F_opt 510B provides better energy efficiency than any point along curve 501B.

Figure 1D:
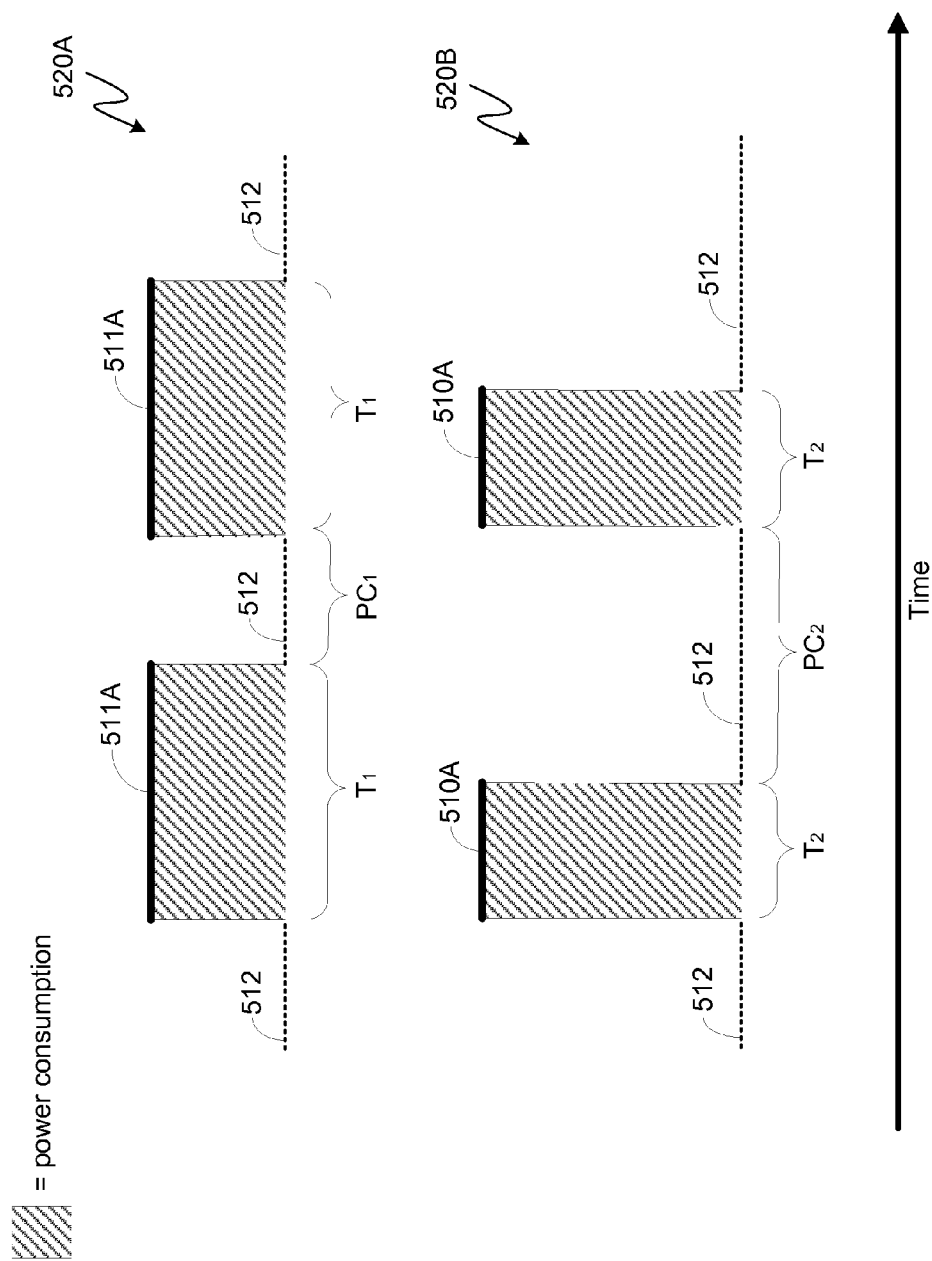
FIG. 1D is a graph illustrating a pair of performance curves of an exemplary processing component operating at different frequencies under a pulse width modulation ("PWM") power management technique.

Turning now to FIG. 1D, a graph 520 illustrating a pair of performance curves of an exemplary processing component operating at different frequencies under a pulse width modulation ("PWM") power management technique is shown. For exemplary purposes, suppose that an embodiment of a dynamic DCVS adjustment method assigned a workload to the core associated with performance curves 501 in FIG. 1C. When the workload was assigned, in the interest of conserving power a power management module may have requested the power frequency be set to point 511A, as the number of MIPS processed by the core at frequency 511A would be adequate to maintain a satisfactory QoS. The dynamic DCVS adjustment method, however, may recognize that the power efficiency of the core associated with curves 501 is better at a frequency represented by F_opt 510A, as described above.

It is envisioned that certain embodiments of a dynamic DCVS adjustment method and system may employ a PWM technique to further increase power efficiency. Continuing with the above example, if the core associated with curves 501 were set at the requested power frequency 511A and run per a PWM technique, the processor will consume power for an amount of time $T_1$ before completing the workload and power collapsing 512 for a time $PC_1$. If, however, the dynamic DCVS adjustment method set the power frequency to the optimal frequency 510A instead of the requested 511A, the energy consumed in order to process the workload would be less per MIPS and the workload would be processed in the shorter period $T_2$. Additionally, further power savings may be realized as the processor stays in a power collapsed mode for the longer period $PC_2$ relative to $PC_1$.

Figure 2A:
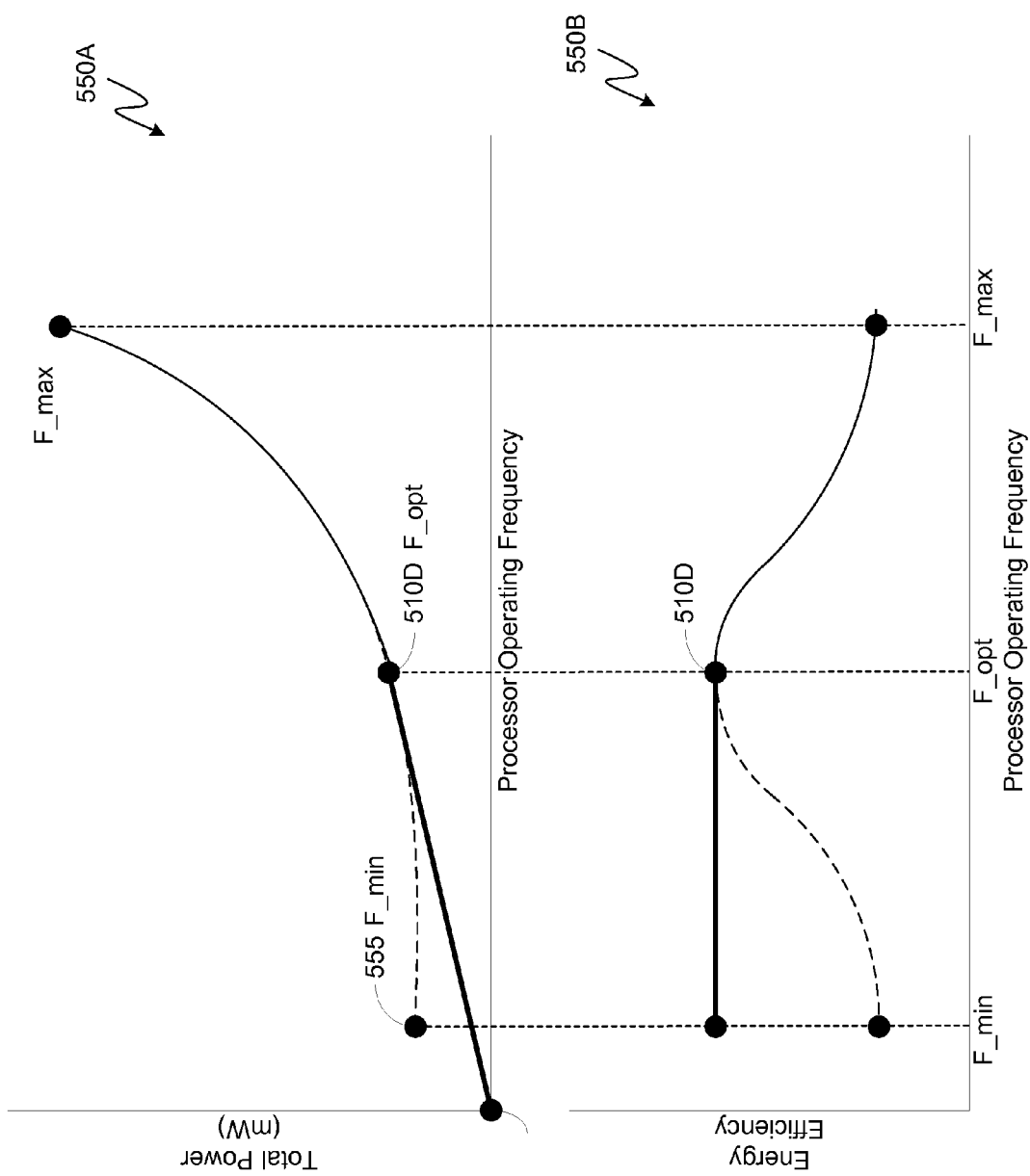
FIG. 2A is a graph illustrating a pair of performance curves of an exemplary processing component operating at a given thermal condition and subject to a thermal mitigation technique.

FIG. 2A is a graph 550 illustrating a pair of performance curves of an exemplary processing component operating at a given thermal condition and subject to a thermal mitigation technique. It is envisioned that in some scenarios a thermal mitigation module may set a limit on a power budget allocated to a given processing component. In such a scenario, an optimal frequency such as F_opt 510D may correspond to a power level that exceeds the power budget.

A dynamic DCVS adjustment system and method may use a PWM technique to operate the processing component in pulses of active durations at the F_opt frequency such that the average power level supplied over a given duty cycle equals the power budget. In this way, the processor may still be run at its most optimal frequency level while not causing the thermal mitigation power budget to be exceeded. Even though the F_opt 510D corresponds to a power level that exceeds the power budget 560, for example, any workload processed under a power budget that limits the frequency to something below F_opt 510D, will be processed at F_opt 510D on a PWM scheme.

Figure 2B:
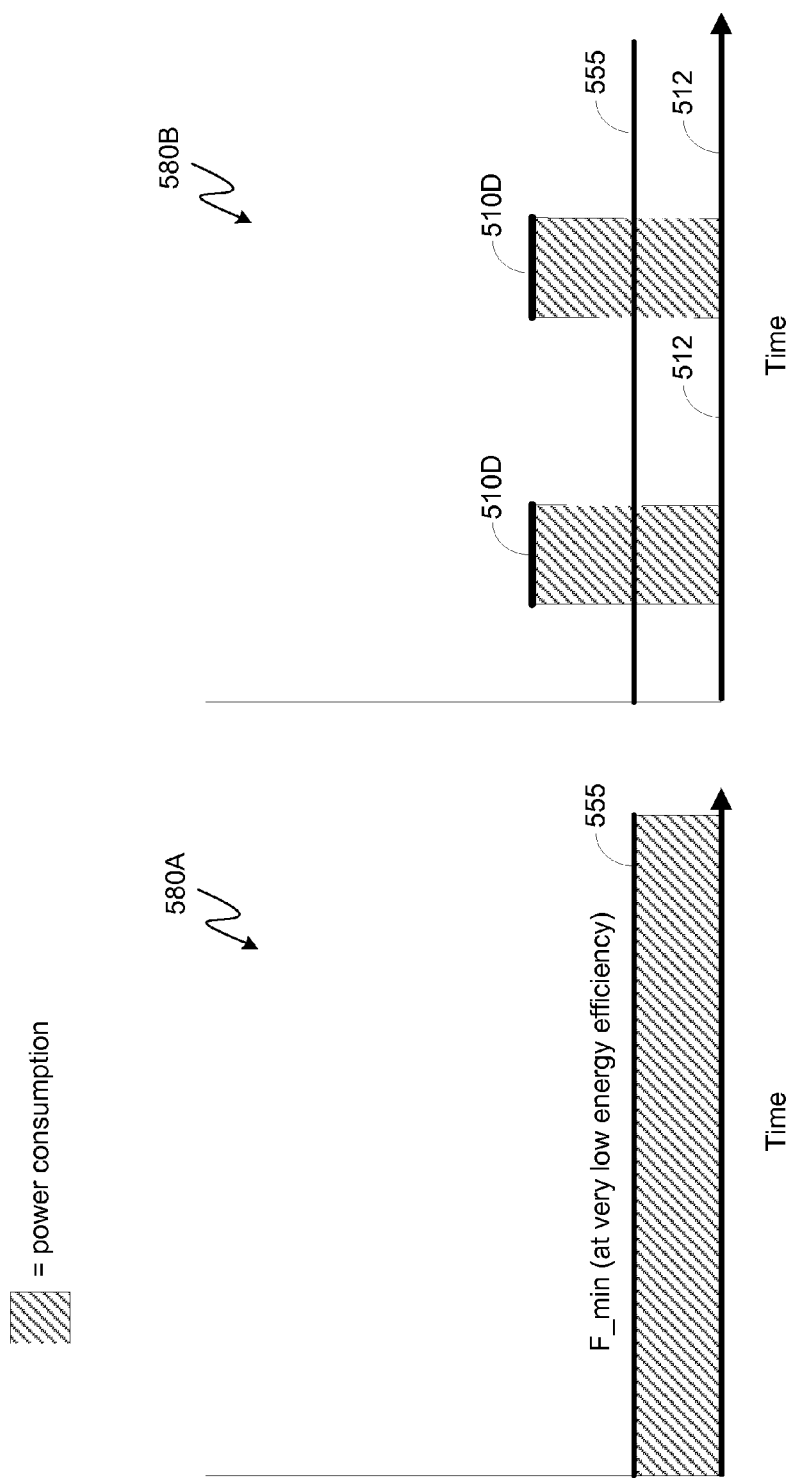
FIG. 2B is a graph illustrating a pair of performance curves of an exemplary processing component operating subject to a thermal mitigation technique and at different frequencies, a minimum frequency versus an optimal frequency under a pulse width modulation ("PWM") power management technique.

FIG. 2B includes graphs 580A and 580B that illustrate the effect of a dynamic DCVS adjustment method that utilizes a PWM scheme in conjunction with an F_opt setting. As described above, a thermal mitigation module may dictate that a certain power budget not be exceeded for a given processing component. In such case, for example, the frequency setting of the processing component may be set to F_min 555 as it correlates to a power level that is within the power budget. Advantageously, a dynamic DCVS adjustment system and method may override the F_min 555 setting in favor of an F_opt 510D setting that is supplied to the processing component per a PWM scheme. Referring to the 580B graph, by pulsing the power at the F_opt 510D level, the power budget constraints set by the thermal mitigation module may be adhered to as the average frequency supplied over a given duty cycle equates to F_min 555.

Figure 3:
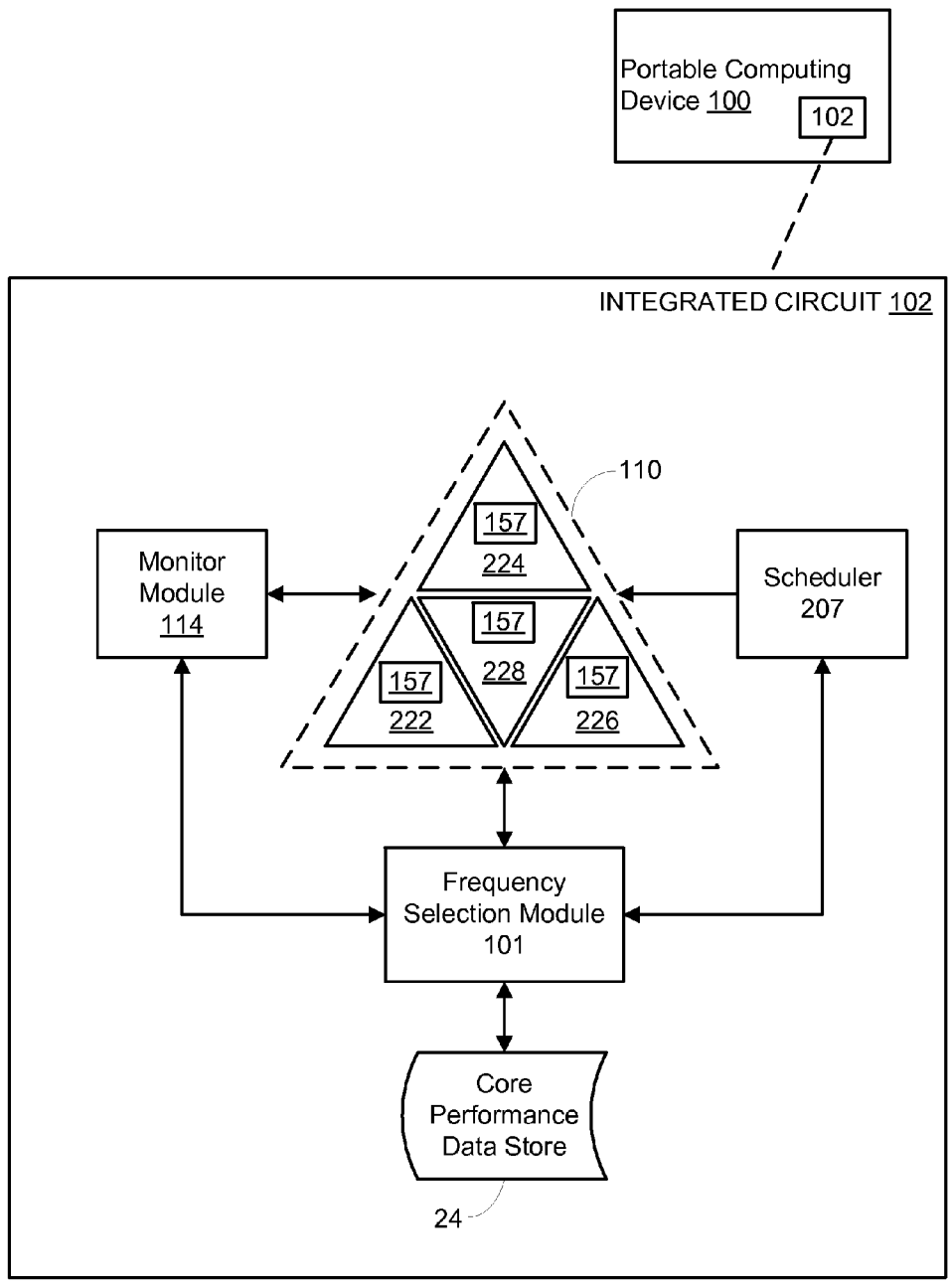
FIG. 3 is a functional block diagram illustrating an embodiment of an on-chip system for dynamic DCVS adjustment and workload scheduling in a portable computing device ("PCD")

FIG. 3 is a functional block diagram illustrating an embodiment of an on-chip system 102 for dynamic DCVS adjustment and workload scheduling in a portable computing device ("PCD") 100. As explained above relative to the FIGS. 1 and 2 illustrations, the workload allocation across the processing components may be based on a comparative analysis of performance curves and optimal frequency settings uniquely associated with the individual cores or processors 222, 224, 226, 228. Notably, as one of ordinary skill in the art will recognize, the processing component(s) 110 is depicted as a group of heterogeneous processing engines for illustrative purposes only and may represent a single processing component having multiple, heterogeneous cores 222, 224, 226, 228 or multiple, heterogeneous processors 222, 224, 226, 228, each of which may or may not comprise multiple cores and/or sub-cores. As such, the reference to processing engines 222, 224, 226 and 228 herein as "cores" will be understood as exemplary in nature and will not limit the scope of the disclosure.

The on-chip system may monitor temperature sensors 157 which are individually associated with cores 222, 224, 226, 228 with a monitor module 114 which is in communication with a frequency selection ("FS") module 101 and a scheduler module 207. The FS module 101 may receive temperature measurements from the monitor module 114 and use the measurements to query performance curves and determine optimum frequency settings. The dynamic DCVS adjustment policies dictated by the FS module 101 may set processor clock speeds at increased levels over requested speeds, apply PWM schemes to power supplies, select processor cores for workload allocation, etc. Notably, through application of dynamic DCVS adjustment policies, the FS module 101 may reduce or alleviate excessive power consumption at the cost of QoS.

As one of ordinary skill in the art will recognize, the operating temperature of one or more of the processing cores 222, 224, 226, 228 may fluctuate as workloads are processed, ambient conditions change, adjacent thermal energy generators dissipate energy, etc. Accordingly, as the operating temperatures of the various processing cores 222, 224, 226, 228 fluctuate, so do the performance curves associated those engines 222, 224, 226, 228. As the operating temperatures associated with each of the cores 222, 224, 226, 228 change, the monitor module 114 recognizes the change and transmits temperature data indicating the change to both the FS module 101. The change in measured operating temperatures may trigger the FS module 101 to reference a core performance ("CP") data store 24 to query performance curves for one or more of the cores 222, 224, 226, 228 based on the measured operating temperatures. Subsequently, the FS module 101 may adjust the power frequency supplied to one or more of the cores 222, 224, 226, 228 so that it is operating at a frequency that delivers the most efficient processing of workload per milliwatt of power consumed. The FS module 101 may also compare the identified performance curves and adjust F_opts in order to select the core 222, 224, 226, 228 best positioned at the time of comparison to efficiently process a given block of code, similar to that which is depicted and described in the above Figures.

An exemplary FS module 101 is configured to leverage a comparative analysis of one or more performance curves associated with the various, diverse processing components 222, 224, 226, 228 to instruct the scheduler module 207 to allocate a workload to a certain processing component which is best positioned to efficiently process the workload. Notably, one of ordinary skill in the art will recognize that, as the operating temperatures of the processing components 222, 224, 226, 228 change, the performance curves queried and compared by the FS module 101 will also change. As such, at different times the FS module 101 may select different processing engines 222, 224, 226, 228 for allocation of repetitive or similar blocks of code. In this way, it is an advantage of certain embodiments that a FS module 101 ensures workload assignments are allocated to the most efficient processing components available at the time of allocation.

Figure 4:
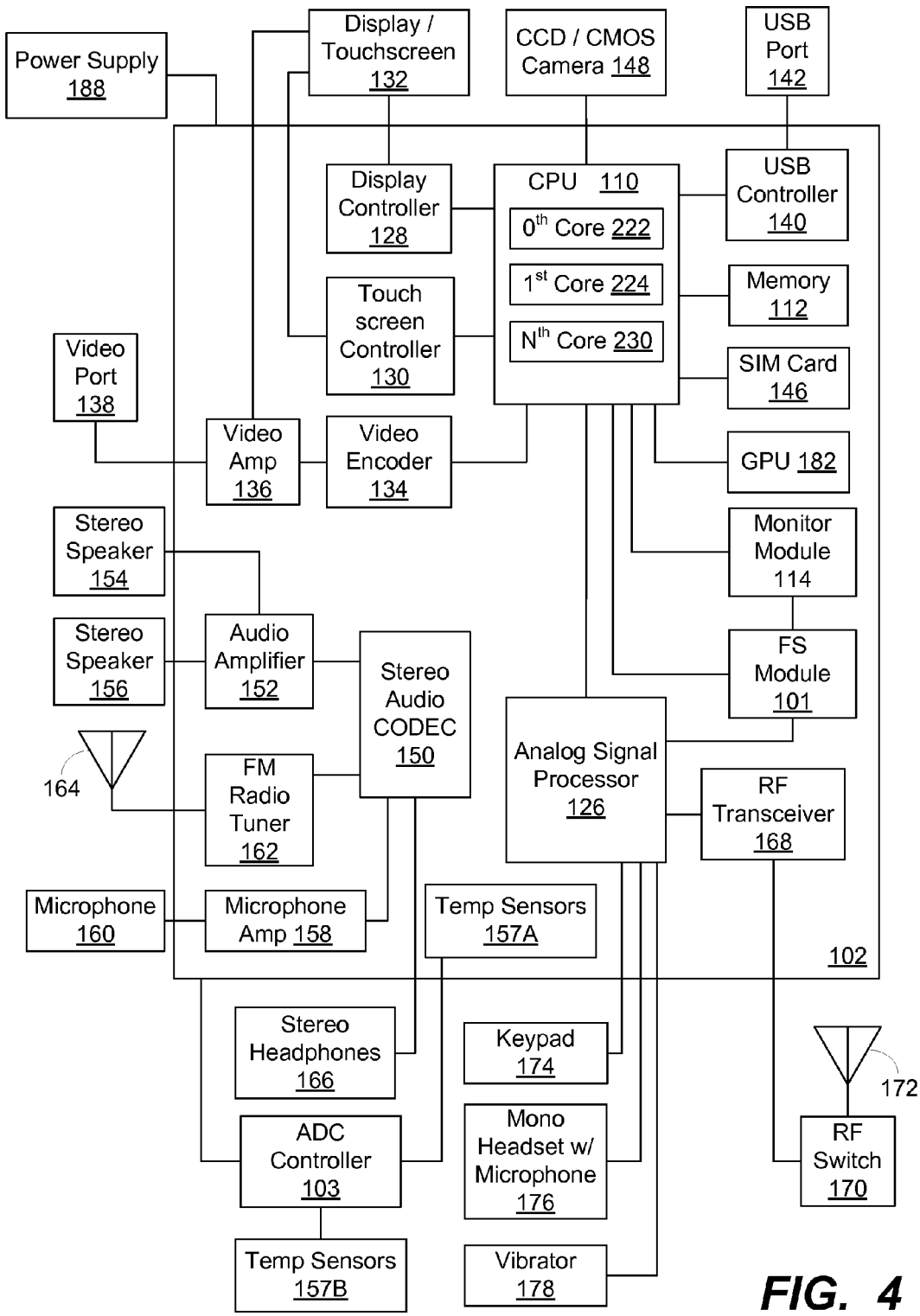
FIG. 4 is a functional block diagram illustrating an exemplary embodiment of the PCD of FIG. 3.

FIG. 4 is a functional block diagram of an exemplary, non-limiting aspect of a PCD 100 in the form of a wireless telephone for implementing methods and systems for monitoring thermal conditions, comparing performance curves, setting optimal power frequencies and scheduling workloads to processing components best positioned for efficient processing. As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions.

In general, the frequency selection module(s) 101 may receive temperature data from the monitor module 114 and use the temperature data to query performance curves associated with the cores 222, 224, 230, determine optimal operating frequencies, perform a comparative analysis of the processing core performance curves and work with a scheduler 207 to schedule blocks of code to the cores 222, 224, 230 that will most efficiently process the workload.

The monitor module 114 communicates with multiple operational sensors (e.g., thermal sensors 157) distributed throughout the on-chip system 102 and with the CPU 110 of the PCD 100 as well as with the FS module(s) 101. The FS module 101 may work with the monitor module 114 to query processor performance curves related to the temperatures monitored by the monitor module 114, compare the curves, set the power frequencies to the most efficient levels, and select the most efficient processor available and capable of processing a block of code.

As illustrated in FIG. 4, a display controller 128 and a touchscreen controller 130 are coupled to the digital signal processor 110. A touchscreen display 132 external to the on-chip system 102 is coupled to the display controller 128 and the touchscreen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touchscreen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the invention.

The thermal sensors 157, in addition to being controlled and monitored by an ADC controller 103, may also be controlled and monitored by one or more FS module(s) 101. The FS module(s) 101 may comprise software which is executed by the CPU 110. However, the FS module(s) 101 may also be formed from hardware and/or firmware without departing from the scope of the invention. The FS module(s) 101 may be responsible for querying processor performance curves and, based on an analysis of those curves, setting the power frequencies to an optimal levels and assigning blocks of code to processors most capable of efficiently processing the code at the time of workload allocation.

Returning to FIG. 4, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more FS module(s) 101. These instructions that form the FS module(s) 101 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 5:
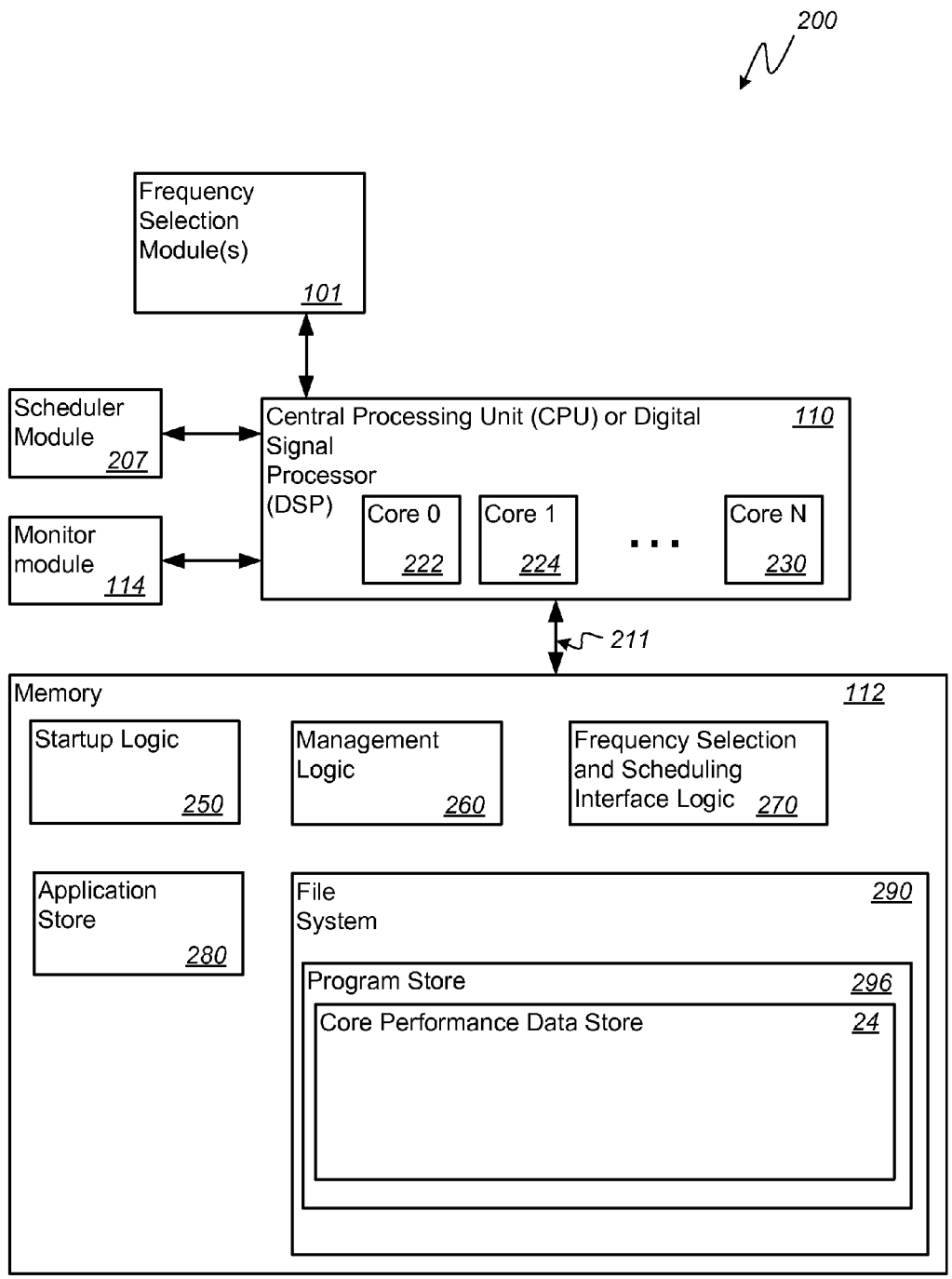
FIG. 5 is a schematic diagram illustrating an exemplary software architecture of the PCD of FIG. 4 for supporting dynamic DCVS adjustment and workload scheduling based on comparative analysis of processor performance curves.

FIG. 5 is a schematic diagram illustrating an exemplary software architecture of the PCD of FIG. 4 for supporting dynamic DCVS adjustment and workload scheduling based on comparative analysis of processor performance curves. Any number of algorithms may form or be part of at least one dynamic DCVS adjustment and scheduling algorithm that may be applied by the FS module 101 when certain thermal conditions exist and associated performance curves analyzed.

As illustrated in FIG. 5, the CPU or digital signal processor 110 is coupled to the memory 112 via a bus 211. The CPU 110, as noted above, may be a multiple-core, heterogeneous processor having N core processors. That is, the CPU 110 may include a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous core, may provide differing levels of performance under similar thermal operating conditions. Alternatively, one or more applications or programs can be distributed for processing across two or more of the available heterogeneous cores.

The CPU 110 may receive commands from the FS module(s) 101 that may comprise software and/or hardware. If embodied as software, the FS module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 5, it should be noted that one or more of startup logic 250, management logic 260, frequency selection and scheduling interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the frequency selection and scheduling interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor (or additional processor cores).

The startup logic 250 includes one or more executable instructions for selectively identifying, loading, and executing a select program for frequency setting and comparative analysis and selection of one or more of the available cores such as the first core 222, the second core 224 through to the $N^{th}$ core 230.

The management logic 260 includes one or more executable instructions for terminating a frequency setting and performance curve analysis program, as well as selectively identifying, loading, and executing a more suitable replacement program for frequency setting, comparative analysis, selection and workload allocation to one or more of the available cores. The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor, may operate in accordance with one or more signals provided by the FS module 101. In this regard, the modules 114 may provide one or more indicators of events, processes, applications, resource status conditions, elapsed time, temperature, etc. in response to control signals originating from the FS module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged core performance data store 24. In this regard, the file system 290 may include a reserved section of its total file system capacity for the storage of information associated with the performance curves of the various cores 222, 224, 226, 228 at various operating temperatures.

Figure 6A:
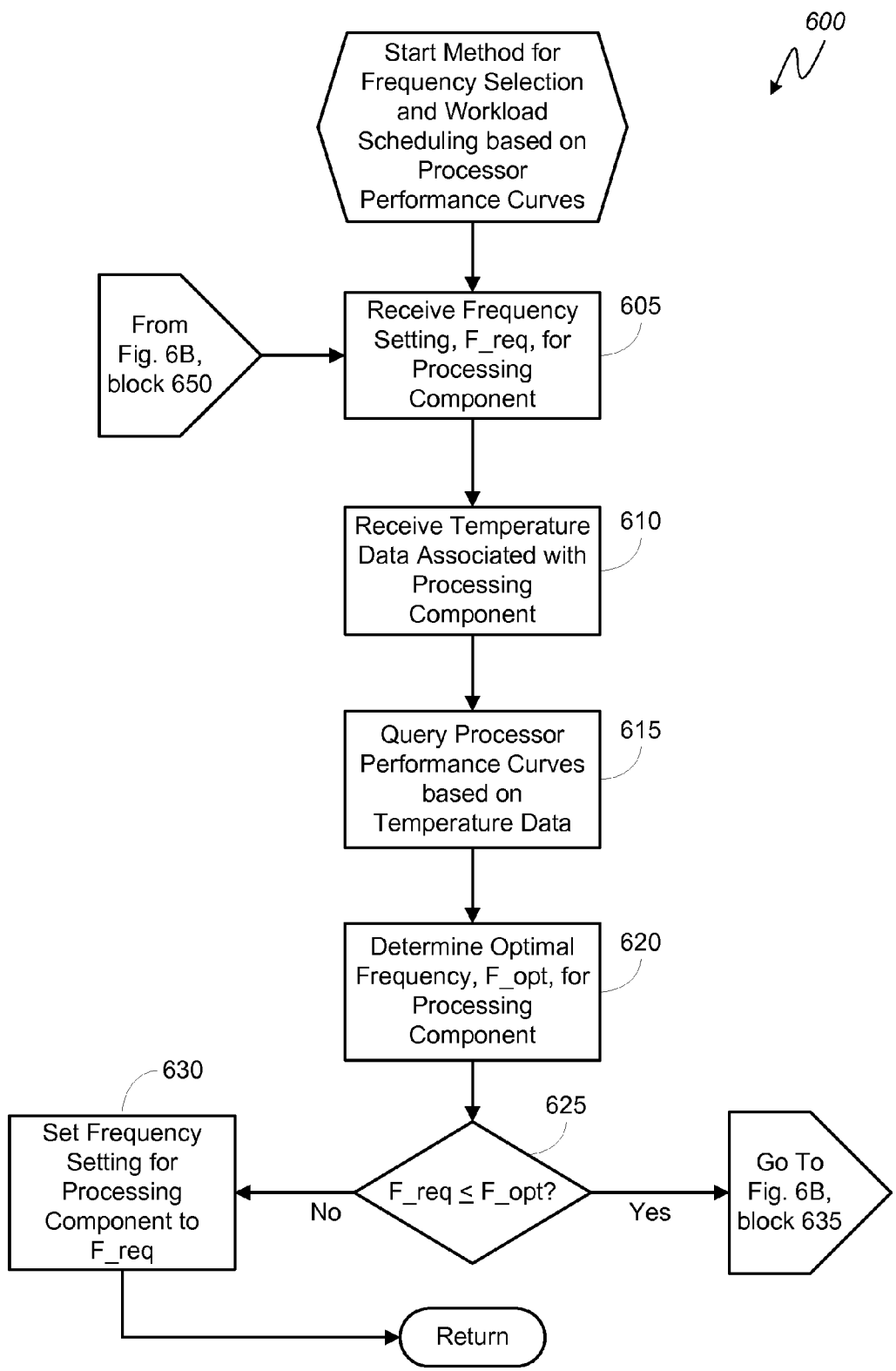
FIGS. 6A-6B is a logical flowchart illustrating an embodiment of a method for dynamic DCVS adjustment and pulse width modulation of power management to a processing component.
Figure 6B:
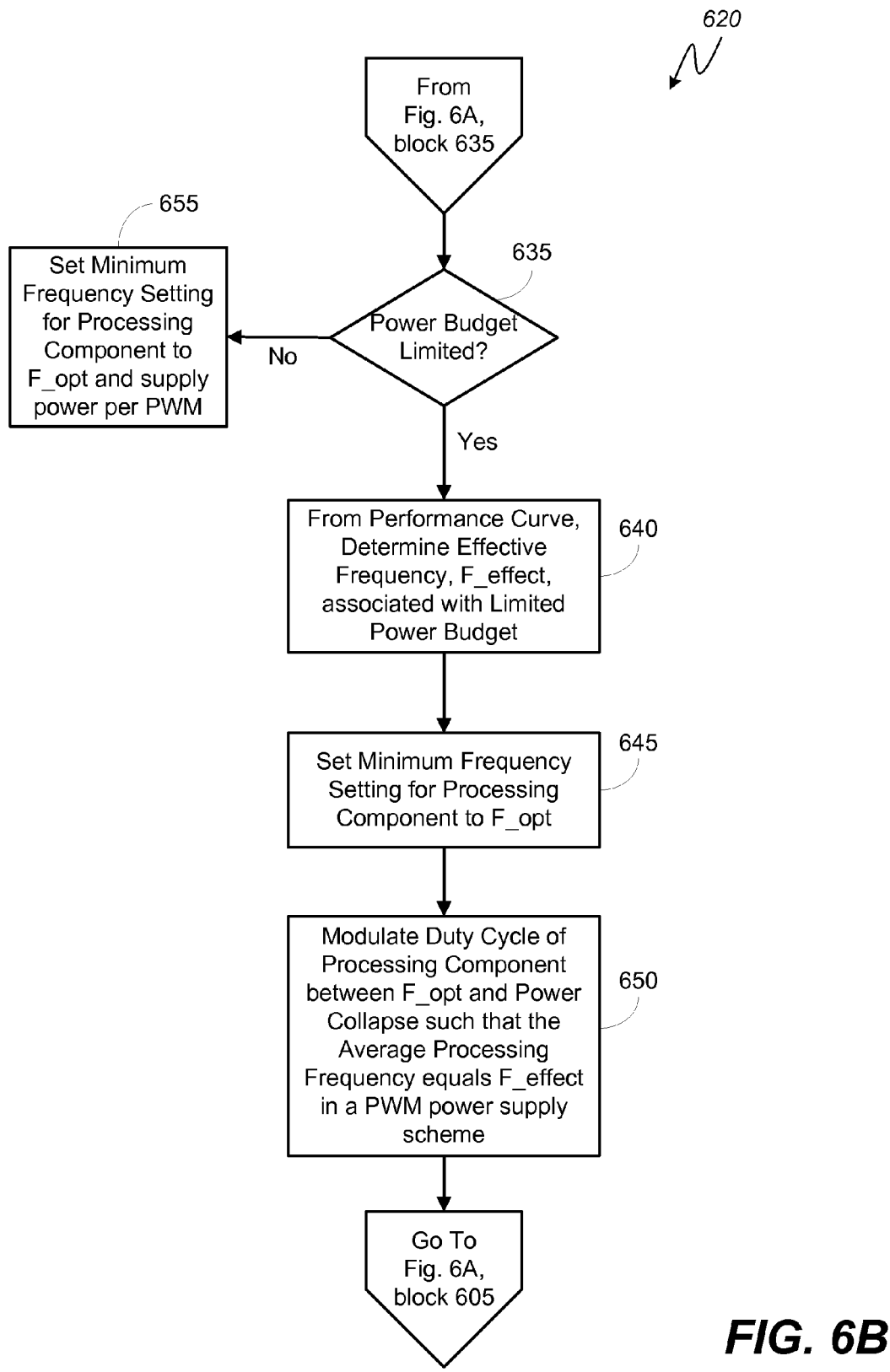

FIGS. 6A-6B is a logical flowchart illustrating an embodiment of a method 600 for dynamic DCVS adjustment and pulse width modulation of power management to a processing component. In the FIG. 6 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocation data received from the FS module 101 and compiled into empirical performance curves. The empirical performance curves may be stored in the CP data store 24 and later referenced by a frequency selection and workload scheduling algorithm.

Beginning at block 605, the FS module 101 and/or monitor module 114 may receive or recognize a request to set a processing component's frequency to a required level, F_req, for processing a given workload. As explained above, the F_req frequency setting may be driven by a power management module seeking to minimize power consumption or a thermal mitigation module seeking to cap a power budget. At block 610, the FS module 101 may request and receive from the monitor module 114 the operating temperature of the processing component such as, for example, the operating temperature associated with one of cores 222, 224, 226, 228. At block 615, the operating temperature of the given core may be used by the FS module 101 to query the CP data store 24 for applicable performance curves.

At block 620, the FS module 101 may determine the optimal frequency setting, F_opt, for the given core when operating at the measured operating temperature. At decision block 625, if the F_req is greater than the F_opt, then the FS module 101 may authorize the power frequency for the given core to be set at the requested frequency, F_req. If, however, at decision block 625 it is determined by the FS module 101 that the F_opt is greater than the F_req, then the process proceeds to decision block 635.

If at decision block 635 the FS module 101 determines that the F_req frequency level is not dictated by a capped power budget, such as may have been implemented by a thermal mitigation module, then the "no" branch is followed to block 655 and the frequency is set to the optimum frequency, F_opt. Further, at block 655 certain embodiments of the system and method may cause the power supplied to the processor core at the F_opt level to be supplied per a PWM scheme. Advantageously, by setting the frequency level at the F_opt instead of the F_req, and by operating the processing component per a PWM scheme, embodiments of the systems and methods may cause workloads to be processed in the most power efficient manner available.

Returning to decision block 635, if the F_req is dictated by a capped power budget for the given processor, the "yes" branch is followed to block 640. At block 640, the FS module 101 may determine from the performance curves the effective power frequency, F_effect, that the processor could run at without exceeding the power budget. Next, at block 645, power frequencies below the F_opt may be disabled such that the lowest available power frequency for supply to the processor is equal to the F_opt. At block 650, the FS module 101 may modulate the duty cycle of the processor per a PWM scheme between the F_opt power frequency and a power collapse state. In this way, the average power frequency supplied to the processor may equate to the F_effect. The process then returns to block 605.

Notably, it is envisioned that at blocks 650 and 655 the duty cycle period of the PWM power management scheme may be statically or dynamically optimized to minimize the inrush current which is proportional to the total power rail capacitance and the voltage step delta. A longer period in the duty cycle may provide less steady performance but have a relatively smaller inrush current as compared to a shorter period that provides more steady performance at a higher inrush current level (see FIGS. 1D and 2B).

Figure 7:
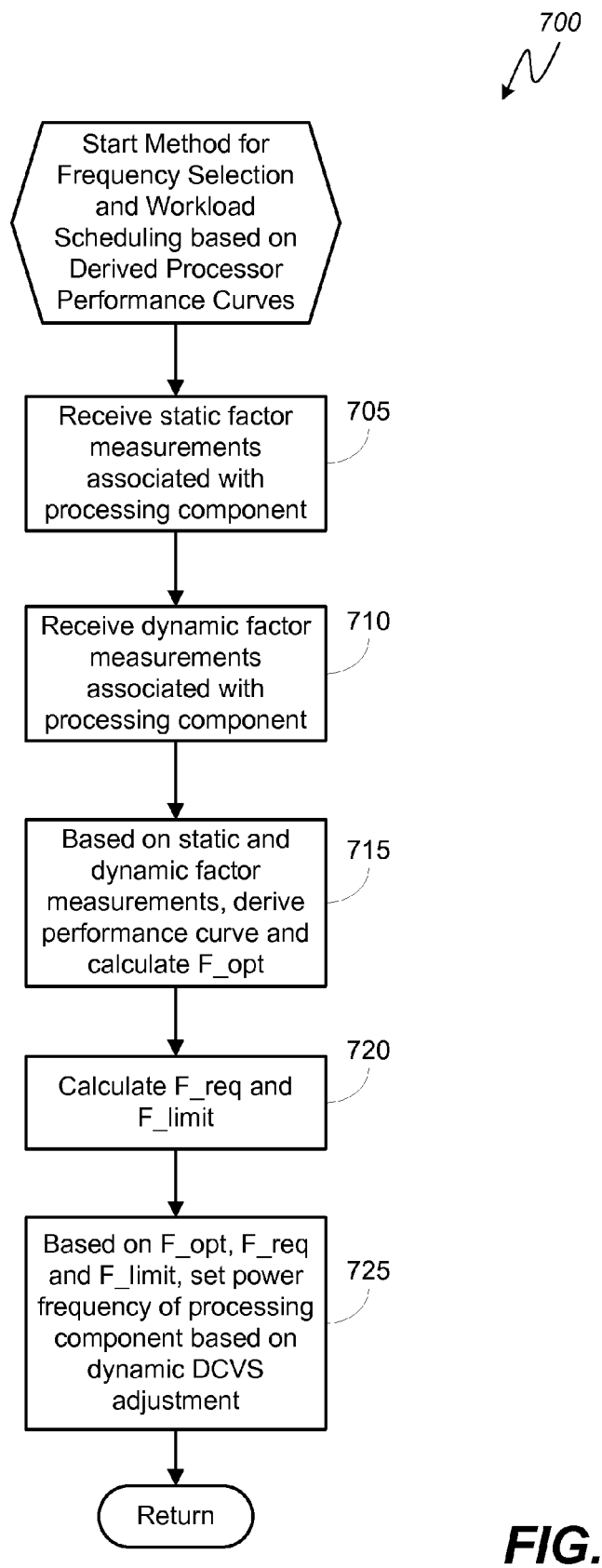
FIG. 7 is a logical flowchart illustrating an embodiment of a method for dynamic DCVS adjustment and pulse width modulation of power management to a processing component based on performance curves derived from static and dynamic measurements.

FIG. 7 is a logical flowchart illustrating an embodiment of a method 700 for dynamic DCVS adjustment and pulse width modulation of power management to a processing component based on performance curves derived from static and dynamic measurements. In the FIG. 7 embodiment, the performance curves for each of the various processing cores 222, 224, 226, 228 may be empirically derived based on actual performance data gathered by the monitoring module 114. In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gathered by the monitor module 114 may be coupled with previous workload allocation data received from the FS module 101 and compiled into empirical performance curves. The empirical performance curves may be stored in the CP data store 24 and later referenced by a frequency selection and workload scheduling algorithm.

Beginning at block 705, the FS module 101 and/or monitor module 114 may receive or recognize measurement data associated with static factors of the processing component. Static factors monitored by the monitor module 114 at block 705 may be read from various hardware components in the PCD 100 and may include, but are not limited to including, quiescent current leakage ("IDDQ"), process variation scaling ("PVS") settings, speed bin settings, etc. Next, at block 710 the monitor module 114 may receive or recognize measurement data associated with dynamic factors of the processing component. Dynamic factors monitored by the monitor module 114 at block 710 may include, but are not limited to including, temperature and power supply voltage margin of the processing component.

Next, at block 715, real-time performance curve data may be derived from the static and dynamic factors measured at blocks 705 and 710. From the derived performance curves, an optimal frequency where the processing component is most efficient in terms of MIPS processed per mW of power consumed may be determined. Subsequently, at block 720, a required frequency and a maximum frequency may be calculated. As explained above, the required frequency, F_req., may be the minimum frequency necessary for the processing component to process a given workload and meet a certain QoS level. Similarly, the maximum frequency, F_limit, may be the maximum sustainable power frequency that may be supplied to the processing component without exceeding a thermal power budget.

Using the F_opt, F_req, and F_limit, the dynamic DCVS adjustment algorithm may at block 725 set the power frequency supplied to the processing component according to the following conditions:

| Condition | Set power frequency supplied to: |
| --- | --- |
| F_limit > F_req > F_opt | F_req |
| F_limit > F_opt > F_req | F_opt (in some embodiments, frequency levels below F_opt may be temporarily disabled) |
| F_req > F_limit > F_opt | F_limit |
| F_req > F_opt > F_limit | F_opt and operate per PWM mode so that average effective frequency is equal to F_limit |
| F_opt > F_limit > F_req | F_opt (in some embodiments, frequency levels below F_opt may be temporarily disabled) |
| F_opt > F_req > F_limit | F_opt and operate per PWM mode so that average effective frequency is equal to F_limit |

Figure 8:
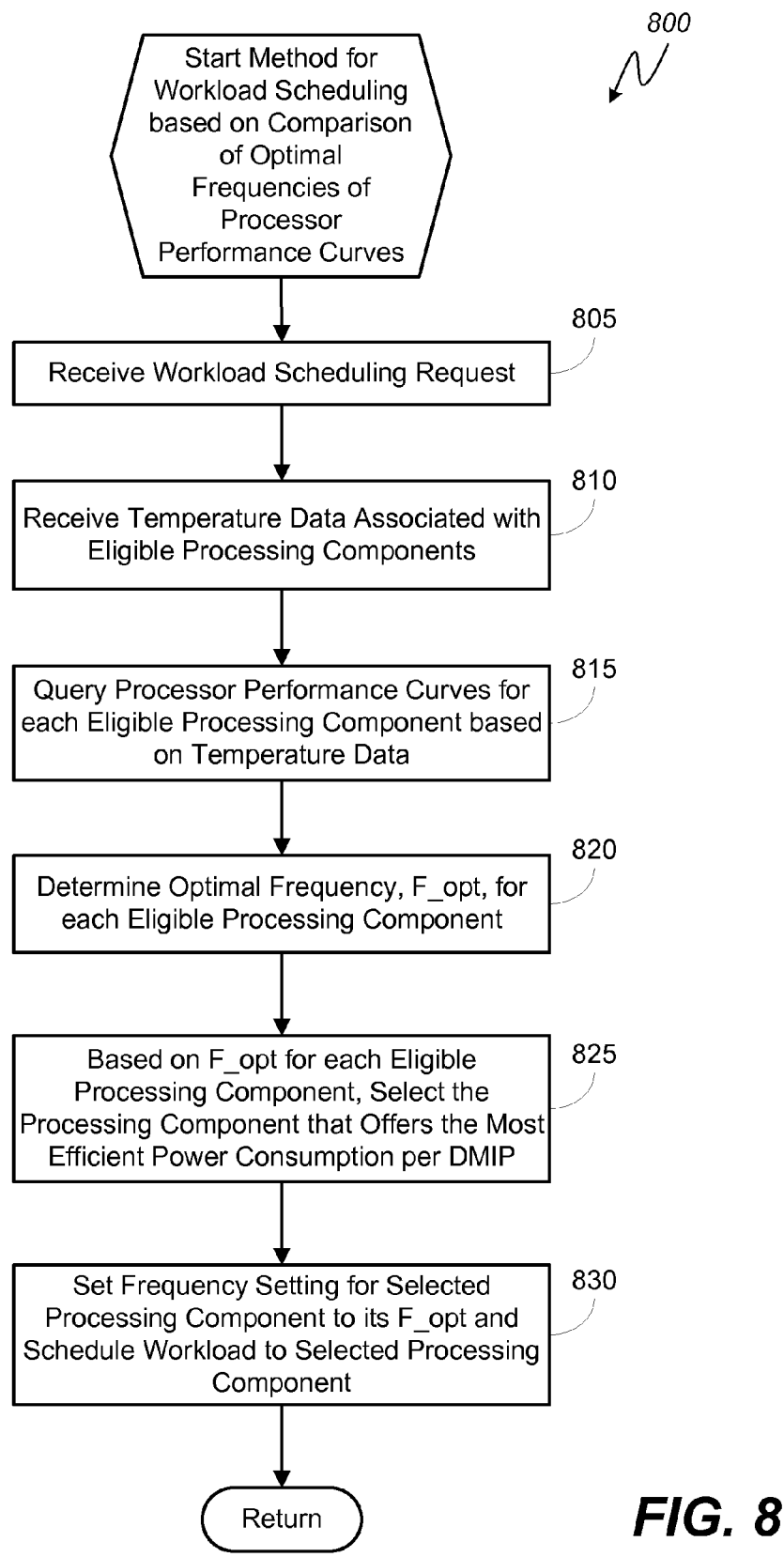
FIG. 8 is a logical flowchart illustrating an exemplary embodiment of a method for workload scheduling based on a comparative analysis of processor performance curves and optimal power frequencies associated with a dynamic DCVS adjustment.

FIG. 8 is a logical flowchart illustrating an exemplary embodiment of a method 800 for workload scheduling based on a comparative analysis of processor performance curves and optimal power frequencies associated with a dynamic DCVS adjustment. Beginning at block 805, the FS module 101 may receive a workload scheduling request from the scheduler 207. At block 810, the FS module 101 may work with the monitor module 114 to receive operating temperature data associated with processing components eligible to process the workload. In some embodiments, the FS module may also receive static and dynamic measurement data to derive performance curves and determine F_opts for each eligible processing component.

At block 815, based on the received data the FS module 101 may query the CP store 24 for the performance curves associated with each eligible processing component or may derive performance curves. From the performance curves, at block 820 the optimal power frequency, F_opt, for each eligible processing component may be determined. Subsequently, at block 825, the power efficiency associated with each F_opt may be compared to determine the processor best positioned to efficiently process the workload. Next, at block 830 the power frequency for the selected processor may be set to its F_opt previously determined at block 820 and the scheduler 207 instructed to allocate the workload to the selected processor.

Notably, it is envisioned that some embodiments may implement the FIG. 7 method 700 for each of the one or more eligible processing components in method 800 and then, based on the power frequency setting determined for each eligible component, select the component best able to efficiently process the given workload. Further, one of ordinary skill in the art will recognize that the exemplary methods described herein may be applicable in SoCs having heterogeneous processing components or homogeneous processing components. Notably, because homogeneous processing components operating under different static and/or dynamic factors may exhibit different workload processing efficiencies, one particular homogeneous processing component may be better able to efficiently process a given workload than another eligible homogeneous processing component.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for dynamically adjusting operating frequency settings of one or more processing components in a portable computing device ("PCD"), the method comprising:

determining a required operating frequency setting ("F_req") for a processing component to process a workload, wherein the required operating frequency setting is the minimum frequency necessary for the processing component to process a given workload and meet a certain quality of service ("QoS") level;

receiving data associated with one or more static and dynamic factors associated with a processing capacity of the processing component;

based on the received data associated with one or more static and dynamic factors associated with a processing capacity of the processing component, deriving performance curves associated with the processing component, wherein the performance curves comprise a representation of the relationship between power consumption and operating frequency for the processing component;

determining from the performance curves the optimal operating frequency ("F_opt") for supplying power to the processing component, wherein when the processing component is supplied power at the optimal operating frequency F_opt the ratio of power consumed per workload processed is optimized; and comparing F_req to F_opt, wherein:
if F_req is greater than or equal to F_opt, the operating frequency setting of the processing component is set to F_req; and
if F_req is less than F_opt, the operating frequency setting of the processing component is set to F_opt.

2. The method of claim 1, further comprising:
if F_req is greater than or equal to F_opt, and F_opt is greater than a maximum frequency ("F_limit") associated with a thermal power budget allocated to the processing component, the operating frequency setting of the processing component is set to F_opt.

3. The method of claim 2, wherein setting the operating frequency setting of the processing component to F_opt further comprises operating the processing component under a pulse width modulation ("PWM") power management scheme such that an average effective frequency substantially equals F_limit.

4. The method of claim 3, wherein the duty cycle period of the PWM power management scheme is optimized to minimize the total amount of inrush current to the processing component.

5. The method of claim 1, further comprising:
if F_req is greater than a maximum frequency ("F_limit") associated with a thermal power budget allocated to the processing component, and F_req is less than F_opt, the operating frequency setting of the processing component is set to F_opt.

6. The method of claim 5, wherein setting the operating frequency setting of the processing component to F_opt further comprises operating the processing component under a pulse width modulation ("PWM") power management scheme such that an average effective frequency substantially equals F_limit.

7. The method of claim 6, wherein the duty cycle period of the PWM power management scheme is optimized to minimize the total amount of inrush current to the processing component.

8. A computer system for dynamically adjusting operating frequency settings of one or more processing components in a portable computing device ("PCD"), the system comprising:

a frequency selection ("FS") module operable to:
  determine a required operating frequency setting ("F_req") for a processing component to process a workload, wherein the required operating frequency setting is the minimum frequency necessary for the processing component to process a given workload and meet a certain quality of service ("QoS") level;
  receive data associated with one or more static and dynamic factors associated with a processing capacity of the processing component;
  based on the received data associated with one or more static and dynamic factors associated with a processing capacity of the processing component, derive performance curves associated with the processing component, wherein the performance curves comprise a representation of the relationship between power consumption and operating frequency for the processing component;
  determine from the performance curves the optimal operating frequency ("F_opt") for supplying power to the processing component, wherein when the processing component is supplied power at the optimal operating frequency F_opt the ratio of power consumed per workload processed is optimized; and
  comparing F_req to F_opt, wherein:
    if F_req is greater than or equal to F_opt, the operating frequency setting of the processing component is set to F_req; and
    if F_req is less than F_opt, the operating frequency setting of the processing component is set to F_opt.

9. The computer system of claim 8, further comprising:
if F_req is greater than or equal to F_opt, and F_opt is greater than a maximum frequency ("F_limit") associated with a thermal power budget allocated to the processing component, the operating frequency setting of the processing component is set to F_opt.

10. The computer system of claim 9, wherein setting the operating frequency setting of the processing component to F_opt further comprises operating the processing component under a pulse width modulation ("PWM") power management scheme such that an average effective frequency substantially equals F_limit.

11. The computer system of claim 10, wherein the duty cycle period of the PWM power management scheme is optimized to minimize the total amount of inrush current to the processing component.

12. The computer system of claim 8, further comprising:
if F_req is greater than a maximum frequency ("F_limit") associated with a thermal power budget allocated to the processing component, and F_req is less than F_opt, the operating frequency setting of the processing component is set to F_opt.

13. The computer system of claim 12, wherein setting the operating frequency setting of the processing component to F_opt further comprises operating the processing component under a pulse width modulation ("PWM") power management scheme such that an average effective frequency substantially equals F_limit.

14. The computer system of claim 13, wherein the duty cycle period of the PWM power management scheme is optimized to minimize the total amount of inrush current to the processing component.

15. A computer system for dynamically adjusting operating frequency settings of one or more processing components in a portable computing device ("PCD"), the system comprising:
  means for determining a required operating frequency setting ("F_req") for a processing component to process a workload, wherein the required operating frequency setting is the minimum frequency necessary for the processing component to process a given workload and meet a certain quality of service ("QoS") level;
  means for receiving data associated with one or more static and dynamic factors associated with a processing capacity of the processing component;
  based on the received data associated with one or more static and dynamic factors associated with a processing capacity of the processing component, means for deriving performance curves associated with the processing component, wherein the performance curves comprise a representation of the relationship between power consumption and operating frequency for the processing component;
  means for determining from the performance curves the optimal operating frequency ("F_opt") for supplying power to the processing component, wherein when the processing component is supplied power at the optimal operating frequency F_opt the ratio of power consumed per workload processed is optimized; and
  means for comparing F_req to F_opt, wherein:
    if F_req is greater than or equal to F_opt, the operating frequency setting of the processing component is set to F_req; and
    if F_req is less than F_opt, the operating frequency setting of the processing component is set to F_opt.

16. The computer system of claim 15, further comprising means for:
if F_req is greater than or equal to F_opt, and F_opt is greater than a maximum frequency ("F_limit") associated with a thermal power budget allocated to the processing component, setting the operating frequency setting of the processing component to F_opt.

17. The computer system of claim 16, wherein means for setting the operating frequency setting of the processing component to F_opt further comprises means for operating the processing component under a pulse width modulation ("PWM") power management scheme such that an average effective frequency substantially equals F_limit.

18. The computer system of claim 15, further comprising means for:
if F_req is greater than a maximum frequency ("F_limit") associated with a thermal power budget allocated to the processing component, and F_req is less than F_opt, setting the operating frequency setting of the processing component is set to F_opt.

19. The computer system of claim 18, wherein means for setting the operating frequency setting of the processing component to F_opt further comprises means for operating the processing component under a pulse width modulation ("PWM") power management scheme such that an average effective frequency substantially equals F_limit.

20. The computer system of claim 19, wherein the duty cycle period of the PWM power management scheme is optimized to minimize the total amount of inrush current to the processing component.

* * * * *